Oct. 14, 1941.   L. S. PFOST   2,259,114
GOVERNOR GEARSHIFT CONTROL DEVICE
Filed Jan. 24, 1938   2 Sheets-Sheet 1

INVENTOR
LESTER S. PFOST
BY A.S.Kroh
ATTORNEY

Oct. 14, 1941.   L. S. PFOST   2,259,114
GOVERNOR GEARSHIFT CONTROL DEVICE
Filed Jan. 24, 1938   2 Sheets-Sheet 2

INVENTOR
LESTER S. PFOST
BY A. S. Krob
ATTORNEY

Patented Oct. 14, 1941

2,259,114

UNITED STATES PATENT OFFICE 2,259,114

GOVERNOR GEARSHIFT CONTROL DEVICE

Lester S. Pfost, Racine, Wis., assignor to The Massey-Harris Company, Racine, Wis., a corporation of Maryland Application January 24, 1938, Serial No. 186,605

2 Claims. (Cl. 74—472)

The present invention relates to a tractor gear shift having a connection to a two speed engine governor and means whereby the governor is automatically thrown into and out of high speed when the gear shift is moved into and out of high tractor speed.

More belt power should be available than is necessary or desirable for driving the tractor; I therefore provide what I term a twin power tractor, one power being suitable for driving the tractor at low-field work speed and the other for belt service and high road speed, each being governor controlled. I accomplish these objects by providing a belt drive pulley of a diameter and speed ratio which requires a higher engine speed and power than the engine speed and power required for tractor draw bar work.

Modern tractors are now equipped with pneumatic tires, therefore it is customary to provide an exceptionally high gear ratio for road travel. To fully accomplish the desired travel speed, it is necessary to considerably increase the speed of the engine, the high engine speed in my device being possible only in high gear. Thus the tractor may be caused to travel at high speed but the high engine speed is not available except when the transmission is in high gear in which position a dangerous pulling torque is not possible because of the high speed ratio.

I also provide means whereby when the tractor engine is used for belt power purposes, and after the high speed governor control has been made operative, the gear shift will be automatically locked in its neutral position to thereby prevent accidentally throwing the gears into mesh.

Generally stated, the objects of the present invention are to provide means whereby the tractor may be more convenient to operate, safer and more economical and adaptable to a greater range of usefullness on the farm and roadway.

To these and other useful ends the present invention consists of parts, combinations of parts or their equivalents, and mode of operation, as hereinafter described, and claimed and shown in the accompanying drawings in which:

Fig. 6 illustrates in vertical section the design of a governor adapted for use with the present invention.

Figure 1:
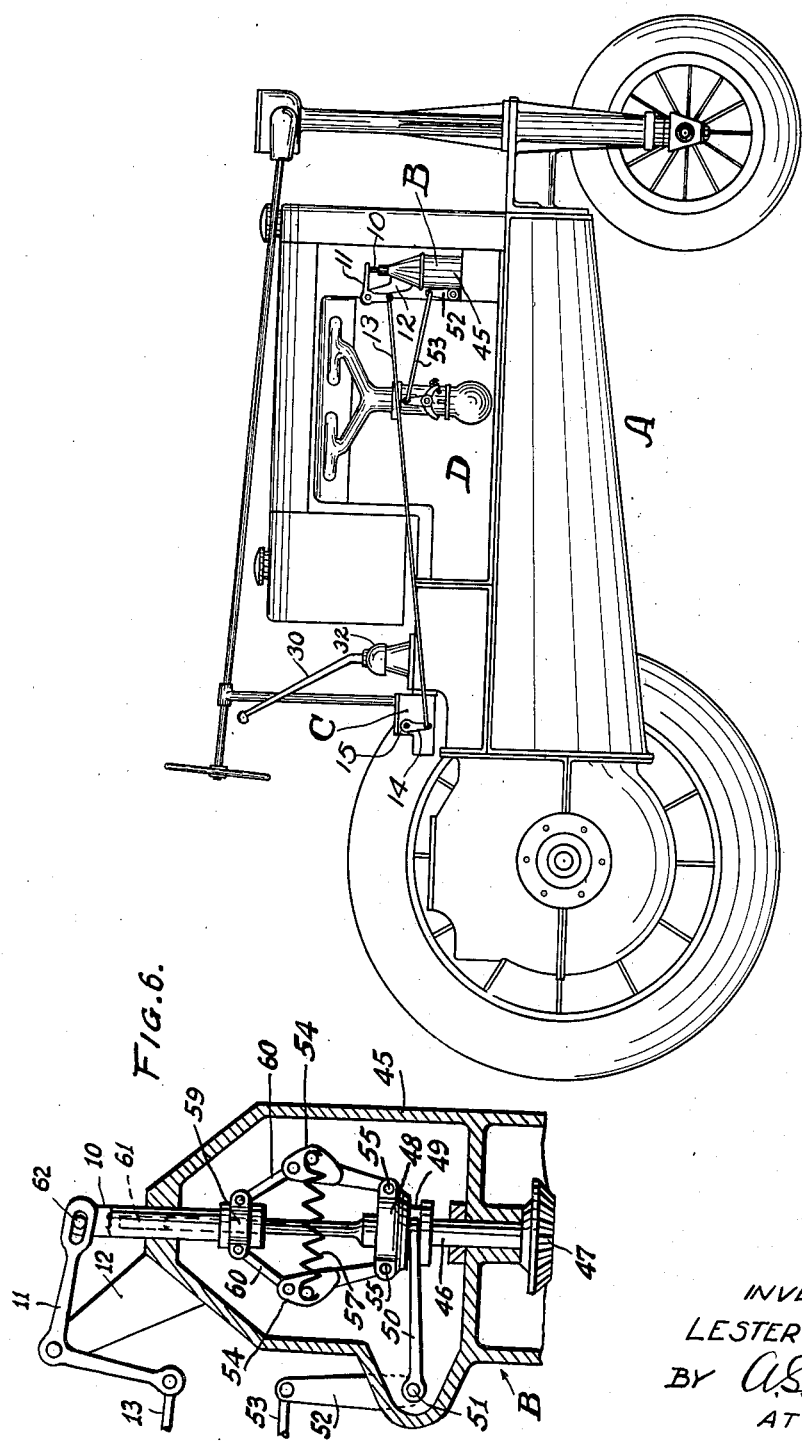
Fig. 1 is a side elevation of a tractor equipped with one form of my invention, having the near rear wheel removed.

As thus illustrated, I have shown the preferred form of my invention wherein the tractor is designated by reference character A. The engine speed controlling governor is designated by reference character B and the mechanism connected to the engine speed governor and the gear shift is designated by reference character C. The engine in Figure 1 is designated by reference character D. Governor B may be any form of centrifugal type which may be adjusted normally to cause the engine D to turn at say 1100 R. P. M. Governor B is preferably mounted within an oil tight housing and is provided with a control member 10 which is slidably mounted in and protrudes through the housing as illustrated.

An operating connection is made between the governor and the gear shifting device by means of bell crank 11, rod 13 and lever 14. Lever 14 is mounted on a shaft 15.

I provide a conventional third and fourth tractor speed gear shift shaft 16. I provide a forwardly projecting lever 17 which is suitably secured to shaft 15. A rod 18 is provided which contacts arm 17 and rests on shaft 16 as indicated. Rod 18 is slidably mounted in the housing of member C. I provide a projection 19 in a cover lid 20 having an opening in which spring 21 is positioned, the spring being long enough to exert considerable pressure on shaft 16 through rod 18.

I provide a steel ball 22 having a suitably mounted pressure spring 23. Shaft 16 is provided with four depressions 24, 25, 26 and 27. Depressions 24, 25 and 26 are suitably positioned whereby ball 22 will hold the rod against accidental movement, when in neutral, high and third gear shift positions. Shaft 16 is illustrated as being in its neutral position. When this shaft is moved so depression 24 is under ball 22, it may be considered as being in position for third or next to high speed gear, and when depression 26 is under ball 22, the shaft may be considered as in high gear position for road travel.

Figure 2:
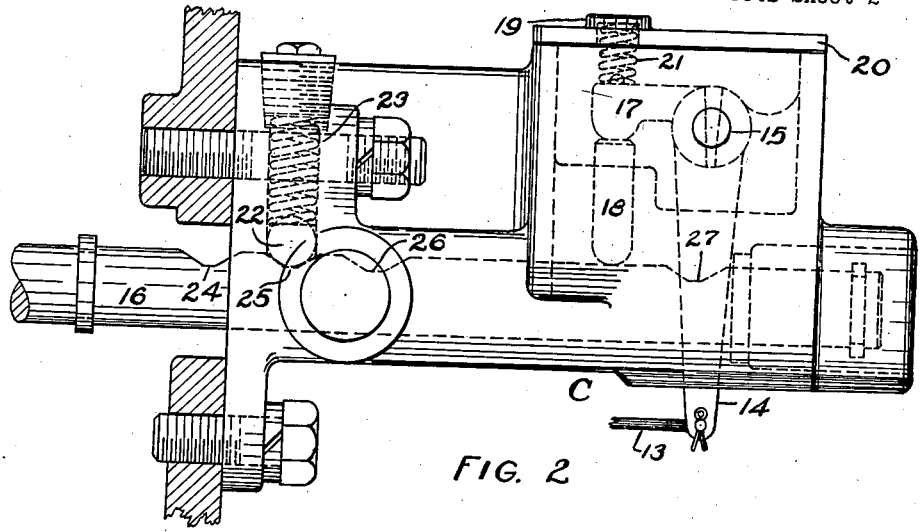
Fig. 2 is an enlarged partially sectioned side view of the part of the high gear shift mechanism illustrated in Figure 1 and having means whereby the governor speed is increased automatically when the high gear is thrown into mesh and reduced again to normal when this gear is thrown out of mesh.

By scrutinizing Figure 2 it will be noted that when gear shift shaft 16 is moved to high gear position, rod 18 will be forced into depression 27 by spring 21; thus lever 14 at its lower end will be moved rearwardly, and as a result, rod 13 will be moved rearwardly and cause bell crank 11 to press member 10 downward. The length of this movement is designed to force member 10 far enough downward to increase the engine speed to say 1400 R. P. M.

Thus it will be seen that when the high gear ratio is in mesh, governor B will cause the engine to travel at high speed or say 1400 R. P. M., and that when this high gear is again shifted out of mesh, member 10 will be raised and the governor will then cause the engine to turn at its normal speed.

Clearly the action of the device will be automatic and when the high gear ratio is used, the engine speed will be increased so as to make the tractor suitable for road travel. In all other operations of the gear shift, the engine speed will clearly be normal or the speed best adapted for draw-bar service.

Figures 3, 4, 5:
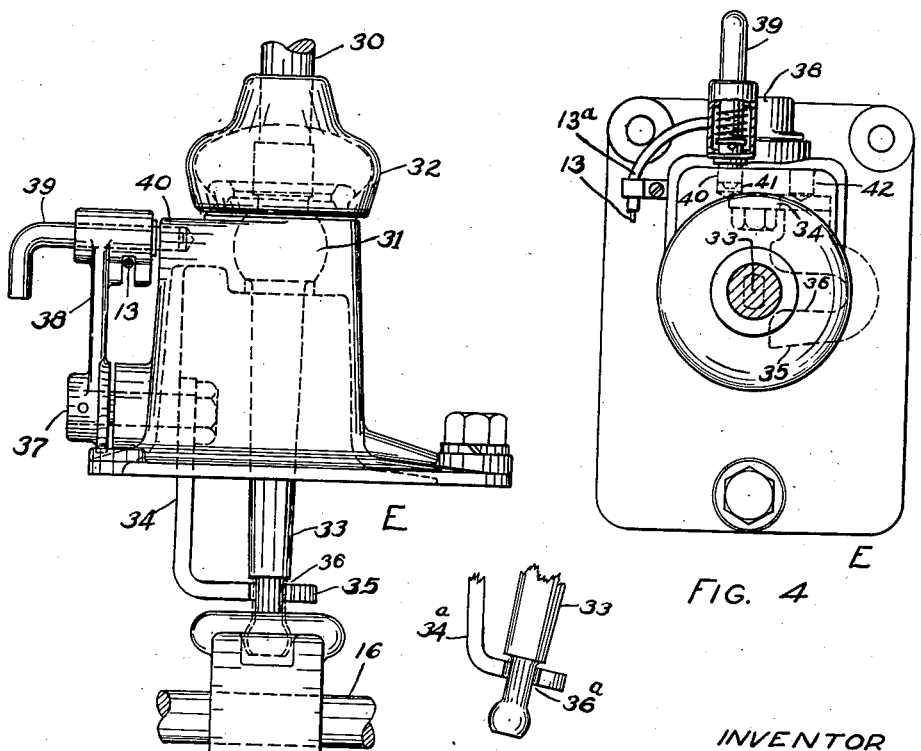
Fig. 3 is an enlarged fractional view of a modification.
Fig. 4 is a partially sectioned top view of the device shown in Figure 3 including a fraction of the control rod and its guiding tube.
Fig. 5 illustrates fractionally the engaging end of the gear shift lever and its locking means as applied to Figures 3 and 4.

Referring now to Figures 3 and 4, wherein a somewhat different form of controlling unit is used in place of unit C. The unit in its entirety is designated by reference character E. The object of this modification is primarily to form a cooperating connection between the gear shift and governor the same as in unit C except that in unit E provision is made for manually increasing the engine speed to say 1400 R. P. M. However, as illustrated in Figures 3 and 4, means are provided whereby the governor cannot be shifted to its high speed except when the gear shifting means is in neutral or in high.

In these modifications, the gear shifting lever 30 is mounted as is customary in devices of the class on a ball 31 having the usual rubber shield 32. The depending arm 33 is made to operatively engage the gear shifting mechanism and move the various gears into mesh according to the position of lever 30. In Figure 3 I have illustrated this rod as being in neutral position, the device being viewed from the right side of the tractor.

I provide a depending lever 34 having at its lower end a horizontally positioned member 35, this member being slotted as at 36. Member 34 is secured to a rotatably mounted shaft 37, on the free end of which is secured a lever 38, the outer end of this lever being provided with a spring actuated member 39 (see Figure 4). This spring is designed to press the protruding end 40 of member 39 into one of two openings 41 or 42. One opening is positioned to hold member 33 in its neutral position as shown in Figure 4.

Member 13 in this design is secured to member 38 and extends at right angle rearwardly through a guide tube 13a whereby when the fork is moved so as to engage member 33 while in neutral, rod 13 will cause bell crank 11 to force member 10 of the governor downwardly, thus to increase the speed of the governor to 1400 R. P. M., at which time the gear shift will be held in its neutral position, thus the engine will be prepared for belt service and there will be no danger of accidentally shifting the gears into mesh during this time.

In Figure 6 I illustrate in vertical section the design of a governor which may be used with my device wherein numeral 45 designates the housing into which the governor is mounted and having a vertically positioned shaft 46 adapted to be driven by a bevel pinion 47 in any suitable manner from the crank or cam shaft of the engine. Head 48 is slidably mounted on shaft 46 and driven thereby by means of a spline or key.

Member 48 is provided with an annular groove 49 which is engaged by the free ends of forked arm 50 which is mounted on a shaft 51, lever 52 being secured to its protruding end as shown. A rod 53 operatively connects lever 52 to the power valve at the carburator as illustrated in Figure 1.

I provide two weights 54—54 having arms which are pivotally mounted on head 48 as at 55—55. Two tension springs 57 (one not shown) are secured to opposite sides of weights 54 thus to act against centrifugal force.

A member 10 is slidably mounted in the top of housing 45, the lower end having rotatably mounted thereon a collar 59, this collar being connected to weights 54 by means of links 60—60. Member 10 is provided with an orifice 61 (see dotted lines) into which the reduced end of shaft 46 is slidably journaled. Bell crank 11 as shown, is operatively connected to member 10 by means of a pin 62, members 10 and 11 each having suitable slots for the purpose, the near portion formed by the slot in member 10 being removed so as to expose to view the slot in member 11.

Thus it will be seen that member 10 will be raised or lowered according to the position of bell crank 11. Member 48 is shown in a medial position. That is, it is operating the engine at normal load but at high speed. If, however, it is desired to operate the engine at low speed, then arm 38 will be moved to the position shown in Figure 4 so member 10 will be moved to its highest position.

Clearly the principal object of the present invention is to form a connection between the gear shift and the governor control. Therefore, obviously, various combinations or connections to the gear shift may be made other than those shown and described. For example, in Figure 5, I have illustrated the position assumed by arm 33 when the transmission is set into high gear or for road work, wherein a slot 36A in arm 34A may be made to lock the high gear into position after the governor has been set manually to operate the engine at high speed.

It will also be understood that other combinations and arrangements of the parts may be used without departing from the spirit and scope of the present invention as recited in the appended claims.

Having thus shown and described the preferred form of my invention I claim:

1. A tractor of the class described, including a two-speed governor controlled engine and a gear shift transmission, a connection between said governor and transmission and means whereby the high speed transmission gear shift position only will permit the governor to operate the engine at its high speed.

2. A tractor of the class described, comprising an engine having a two speed governor therefor, a gear shift transmission, a connection between said gear shift transmission and said governor and means whereby the high speed transmission position will shift the governor to high speed, and whereby the governor will cause the engine to turn at normal speed when said gear shift is not in its high speed position.

LESTER S. PFOST.